(12) United States Patent
Xian et al.

(10) Patent No.: US 12,477,220 B2
(45) Date of Patent: Nov. 18, 2025

(54) APPARATUSES, METHODS, AND COMPUTER PROGRAM PRODUCTS FOR COMPREHENSIVE FOCUSING IN IMAGING ENVIRONMENTS

(71) Applicant: Hand Held Products, Inc., Charlotte, NC (US)

(72) Inventors: Tao Xian, Mt. Laurel, NJ (US); Eric Alfons Youngblood, Matthews, NC (US); Timothy Good, Indian Land, SC (US); Jeffrey Harper, Charlotte, NC (US); David Matthew Wilz, Sewell, NJ (US); Manjul Bizoara, Charlotte, NC (US); Erik Van Horn, Seaville, NJ (US); Ka Au, Charlotte, NC (US); Shankar Ban, Fort Mill, SC (US); Thomas Haggerty, Haddon Township, NJ (US)

(73) Assignee: Hand Held Products, Inc., Charlotte, NC (US)

( * ) Notice: Subject to any disclaimer, the term of this patent is extended or adjusted under 35 U.S.C. 154(b) by 64 days.

(21) Appl. No.: 18/613,905

(22) Filed: Mar. 22, 2024

(65) Prior Publication Data
US 2025/0301219 A1    Sep. 25, 2025

(51) Int. Cl.
*H04N 23/67* (2023.01)
*G06K 7/10* (2006.01)
(Continued)

(52) U.S. Cl.
CPC ....... *H04N 23/671* (2023.01); *G06K 7/10831* (2013.01); *G06K 7/1413* (2013.01); *H04N 23/56* (2023.01)

(58) Field of Classification Search
None
See application file for complete search history.

(56) References Cited

U.S. PATENT DOCUMENTS 8,292,183 B2    10/2012 Li et al.
2014/0166758 A1*  6/2014 Goren ................ G06K 7/10801
                                                235/462.21
(Continued)

FOREIGN PATENT DOCUMENTS

CN    109426747 A    3/2019
EP     4191466 A1    6/2023
(Continued)

OTHER PUBLICATIONS

Extended European Search Report Mailed on Sep. 5, 2025 for EP Application No. 25158208, 8 page(s).

*Primary Examiner* — Kristy A Haupt
(74) *Attorney, Agent, or Firm* — ALSTON & BIRD LLP

(57) ABSTRACT

Embodiments of the disclosure include methods, computer program products, and apparatuses configured for selecting a lens focusing scheme based on a detectability level of an aimer pattern. An imaging engine projects an aimer pattern onto a target object within a field of view of a first imager of an imaging engine. The imaging engine acquires a first image of the target object via the first imager. The imaging engine selects a lens focusing scheme based on a detectability level of the aimer pattern in the first image, in which selection of the lens focusing scheme is between a first lens focusing scheme associated with a location of the aimer pattern and a second lens focusing scheme associated with at least one predefined lens position. The imaging engine determines a focus position for a lens in accordance with the lens focusing scheme.

23 Claims, 4 Drawing Sheets

(51) Int. Cl.
*G06K 7/14* (2006.01)
*H04N 23/56* (2023.01)

(56) References Cited

U.S. PATENT DOCUMENTS

| | | | |
|---|---|---|---|
| 2015/0339506 A1* | 11/2015 | Chen | G06K 7/10811 235/462.21 |
| 2020/0200996 A1 | 6/2020 | Brock et al. | |
| 2022/0224823 A1 | 7/2022 | Poloniewicz et al. | |
| 2023/0114004 A1* | 4/2023 | Gurevich | H04N 23/671 235/454 |
| 2023/0177293 A1 | 6/2023 | Moro et al. | |

FOREIGN PATENT DOCUMENTS

| | | |
|---|---|---|
| JP | 5515887 B2 | 6/2014 |
| WO | 99/64980 A1 | 12/1999 |

\* cited by examiner

APPARATUSES, METHODS, AND COMPUTER PROGRAM PRODUCTS FOR COMPREHENSIVE FOCUSING IN IMAGING ENVIRONMENTS

TECHNOLOGICAL FIELD

Embodiments of the present disclosure generally relate to lens focusing in imaging environments, such as barcode scanners and/or other symbology scanners.

BACKGROUND

Imaging devices, such as barcode scanners, may include an imaging engine with one or more imaging apparatuses ("imagers"). The one or more imagers may be utilized to capture images of the respective field of view of the one or more imagers. The one or more imagers may have a respective operating range and capabilities. For example, a first imager may be configured to operate in a short distance range, while a second imager may be configured to operate in a longer distance range than the first imager. In various contexts, an imaging engine may utilize an aimer to focus one or more imagers included in the imaging engine. The imaging engine may use the aimer to project a light pattern into an environment. For example, the imaging engine may project the aimer pattern in a particular direction, such that the aimer pattern is on or near a target object (e.g., for capturing an image of the target object). A user of the imaging engine may use the aimer pattern as an indicator, for example to determine whether the imaging engine is oriented in a suitable direction for capturing one or more images of the target object using the one or more imagers. Additionally, the imaging engine may use the aimer pattern for distance measurements, for example, to focus the one or more imagers for capturing the one or more images.

New techniques for utilizing an aimer pattern to focus one or more imagers are needed. The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

In general, embodiments of the present disclosure provided herein are configured for lenses focusing in a multi-imager environment, such as in a multi-imager imaging apparatus. Other implementations for lenses focusing in a multi-imager environment will be, or will become, apparent to one with skill in the art upon examination of the following figures and detailed description. It is intended that all such additional implementations be included within the scope of the disclosure, and be protected by the following claims.

In accordance with at least one aspect of the present disclosure, a method is provided. The method may be implemented using any one of a myriad of implementations, such as via hardware, software, and/or firmware of an imaging engine and/or multi-imager imaging apparatus as described herein. In at least one example implementation of the method, the example method includes projecting, during a first time occasion, an aimer pattern onto a target object within a field of view of a first imager of an imaging engine. The example method further includes acquiring, during the first time occasion, a first image of the target object via the first imager. The example method further includes selecting a lens focusing scheme based on a detectability level of the aimer pattern in the first image, where selection of the lens focusing scheme is between a first lens focusing scheme associated with a location of the aimer pattern and a second lens focusing scheme associated with a predefined lens position. The example method further includes determining a focus position for a lens in the imaging engine in accordance with the lens focusing scheme.

In some embodiments of the method, the method further includes selecting the first lens focusing scheme based on the detectability level of the aimer pattern satisfying a threshold, where determination of the focus position for the lens is in accordance with the first lens focusing scheme.

Additionally, or alternatively, in some such embodiments of the example method, the method further includes identifying the location of the aimer pattern based on the first image; and determining, using one or more lookup tables, the focus position for the lens based on the location of the aimer pattern.

Additionally, or alternatively, in some such embodiments of the example method, the one or more lookup tables are associated with the first imager.

Additionally, or alternatively, in some such embodiments of the example method, the method further includes estimating, using a first lookup table of the one or more lookup tables, a distance between the imaging engine and the target object, where the distance is based on the location of the aimer pattern; and determining, using a second lookup table, the focus position for the lens based on the distance.

Additionally, or alternatively, in some such embodiments of the example method, the method further includes selecting an imager of the imaging engine based on the distance, where the lens is included in the imager, and where the imager includes the first imager or a second imager of the imaging engine.

Additionally, or alternatively, in some such embodiments of the example method, the method further includes determining, using the one or more lookup tables, a second focus position for the lens based on the location of the aimer pattern corresponding to an intermediate focus position between the focus position and the second focus position; acquiring a second image of the target object using the lens in accordance with the focus position; and acquiring a third image of the target object using the lens in accordance with the second focus position.

Additionally, or alternatively, in some such embodiments of the example method, the method further includes acquiring a second image of the target object using the lens in accordance with the focus position; performing one or more operations to decode visual indicia within the second image; and determining a second focus position for the lens in accordance with the second lens focusing scheme based on a failure to successfully decode the visual indicia within the second image.

In some embodiments of the method, the method further includes determining, using a single lookup table, the focus position for the lens based at least in part on the location of the aimer pattern.

In some embodiments of the method, the method further includes selecting the second lens focusing scheme based on the detectability level of the aimer pattern failing to satisfy a threshold, where determination of the focus position for the lens is in accordance with the second lens focusing scheme.

Additionally, or alternatively, in some such embodiments of the example method, the method further includes selecting a predefined lens position for the focus position of the lens, where the predefined lens position is based on a priority associated with the predefined lens position, and where the priority corresponds to a likelihood of successfully decoding visual indicia in images acquired using the predefined lens position.

Additionally, or alternatively, in some such embodiments of the example method, the predefined lens position is based on one or more lens positions used to acquire one or more other images via the imaging engine prior to the first time occasion, where decoding visual indicia included in the one or more other images was successful.

Additionally, or alternatively, in some such embodiments of the example method, the priority is based on a depth of field associated with the predefined lens position, a distance between a previous position of the lens and the predefined lens position, a decoding status associated with one or more other images acquired using the predefined lens position, an environment of the target object, or any combination thereof.

Additionally, or alternatively, in some such embodiments of the example method, the predefined lens position is one of a plurality of candidate lens positions, and where selection of the predefined lens position is in accordance with a sequence that is based on a respective priority associated with each candidate lens position of the plurality of candidate lens positions.

Additionally, or alternatively, in some such embodiments of the example method, the method further includes acquiring, during a second time occasion after the first time occasion, a second image of the target object using the lens in accordance with the predefined lens position; and selecting, in accordance with the sequence, a second predefined lens position based on a failure to successfully decode visual indicia within the second image, where the second predefined lens position includes another one of the plurality of candidate lens positions, and where the predefined lens position has a higher priority than the second predefined lens position.

Additionally, or alternatively, in some such embodiments of the example method, the method further includes positioning the lens in the predefined lens position during the first time occasion, where the lens is included in a second imager of the imaging engine.

In some embodiments of the method, the method further includes selecting an illuminator source for acquisition of one or more images using the lens in accordance with the predefined lens position, where selection of the illuminator source is based on the focus position.

In some embodiments of the method, the method further includes projecting, during a second time occasion after the first time occasion, the aimer pattern onto a second target object, where the second target object includes the target object or another target object; acquiring, during the second time occasion, a second image of the second target object in accordance with the focus position for the lens, where acquisition of the second image during the second time occasion is based on a predefined periodicity or expiration of a timer; and determining a second focus position based on the detectability level of the aimer pattern in the second image.

In some embodiments of the method, the detectability level is based on an average region of interest and an intensity difference between one or more pixels associated with the aimer pattern in the first image and one or more other pixels in the first image.

In some embodiments of the method, the imaging engine comprises a multi-imager imaging engine.

In some embodiments of the method, the location of the aimer pattern corresponds to a position of at least one pixel in the first image.

In accordance with another aspect of the present disclosure, an apparatus is provided. The apparatus may be implemented in any combination of hardware, software, and/or firmware as described herein. In at least one example embodiment, the apparatus includes an imaging engine. The example apparatus further includes one or more processors in communication with the imaging engine, which may be embodied in any one of a myriad of implementations via hardware, software, and/or firmware (including, without limitation, a memory, microprocessor, ASIC, FPGA, and/or the like). In some embodiments of the apparatus, the one or more processors include or are in communication with one or more memory devices. The one or more processors of the example apparatus configures the apparatus to perform any one of the example methods described herein.

In accordance with yet another aspect of the present disclosure, a computer program product is provided. The computer program product includes at least one non-transitory computer-readable storage medium having computer code stored thereon. The computer program code, in execution with at least one processor, is configured for performing any one of the example methods described herein.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements may be exaggerated relative to other elements. Embodiments incorporating teachings of the present disclosure are shown and described with respect to the figures presented herein, in which.

DETAILED DESCRIPTION

Figure 1:
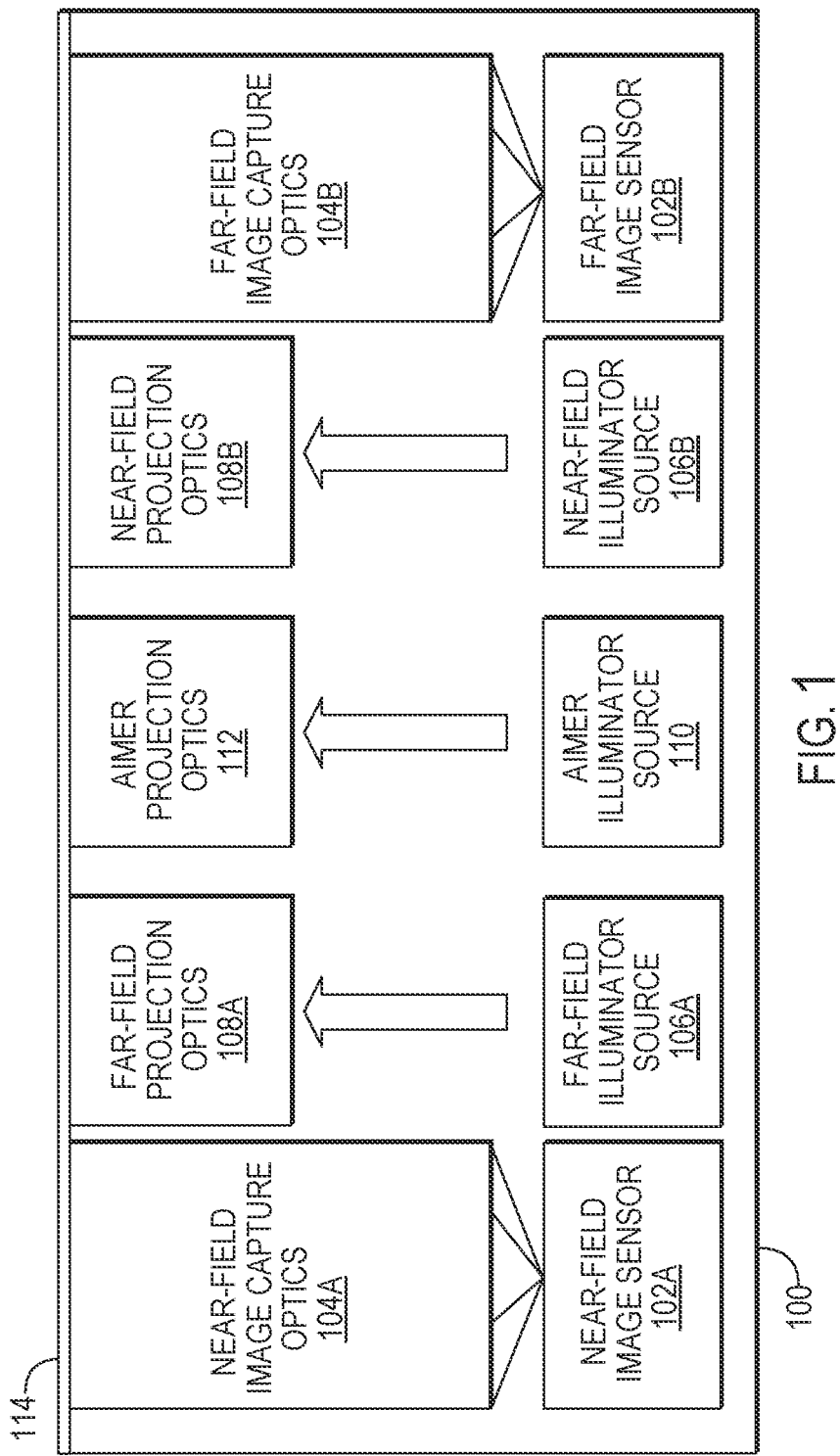
FIG. 1 illustrates a block diagram of an example multi-imager imaging engine, in accordance with at least one example embodiment of the present disclosure.

Various embodiments of the present disclosure are described more fully hereinafter with reference to the accompanying drawings, in which some, but not all, embodiments of the disclosure are shown. Indeed, embodiments of the disclosure may be embodied in many different forms and, accordingly, the disclosure should not be construed as limited to the embodiments set forth herein. Rather, the embodiments set forth herein are provided so that this disclosure will satisfy applicable legal requirements. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communications circuitry, input/output circuitry, and the like. In some embodiments, other elements may provide or supplement the functionality of particular circuitry.

Overview

An imaging device, such as a barcode scanner, may be configured to capture one or more image data objects for the purposes of decoding the captured data to perform one or more image processing tasks. In one example context, an imaging device may be configured to process one or more captured image data objects to attempt to identify and/or decode visual indicia within the captured data. For example, the imaging device may include one or more imagers configured to detect (e.g., capture an image of) a barcode and decode the barcode using the captured image. In some examples, a lens of an imager may be improperly positioned. In such examples, the barcode may be relatively unclear (e.g., out of focus) in the image and the imaging device may fail to decode the barcode. For example, the position of the lens in the imaging device, referred to herein as a focus position, may be determined based on a measured (or estimated) distance between the scanner and a target object (e.g., the barcode). Accordingly, an inaccurate distance measurement may lead to an improper or unsuitable focus position for the lens.

To improve the accuracy of distance measurements, an imaging device may be configured with an aimer. The aimer may have multiple functionalities. In some non-limiting examples, the aimer may be used for distance measurements and as a user indicator. For example, a user may utilize the aimer to project an aimer pattern onto a target object (e.g., a barcode to be decoded). The location of the aimer pattern may indicate an orientation of the imaging device (e.g., the direction the imaging device is pointed). Accordingly, based on the location of the aimer pattern, the user may determine whether the scanner is pointed in the direction of the target object and, as such, whether the target object may be captured in an image acquired by the imaging device. The imaging device may additionally, or alternatively, use the aimer pattern for one or more distance measurements. For example, the imaging device may use triangulation based on the location of the aimer pattern to conduct a distance measurement for determining a focus position for a lens, which may be used to capture one or more images of the target object.

Imaging devices have a wide range of applications across various industries and are consequently used in highly dynamic environments. For example, users may utilize imaging devices (e.g., barcode scanners) in a multitude of environments with varying ambient light conditions. In one non-limiting example, a user may utilize a barcode scanner in environments ranging from warehouses with relatively low ambient light conditions (e.g., about 3 Lux) to outdoor areas with relatively high ambient light conditions (e.g., about 100K Lux). The presence of extraneous light in relatively high ambient light conditions may reduce the contrast of images captured in such conditions. For example, the extraneous light may lead to a relatively narrow distribution of pixel intensities in a captured image (e.g., may cause a relatively small variation in brightness levels throughout the image), and distinctions between objects or features in the image may appear dull or indistinct due to a lack of (or relatively low) contrast between adjacent pixels. Thus, for images with relatively low contrast (e.g., images captured in relatively high ambient light conditions, images with a relatively narrow distribution of pixel intensities), the accuracy and/or reliability with which the aimer pattern may be distinguished from one or more surrounding objects may be relatively low, which may lead to inaccurate and/or unreliable distance measurements. Other environmental factors, such as dust and uneven lighting, may additionally, or alternatively, reduce the detectability of an aimer pattern in an image.

Further, some barcode scanners may be configured with a relatively large quantity of focus positions (e.g., steps, lens states) to accommodate for increased barcode densities and/or increased distance ranges over which the barcode scanners are used. In some cases, configuring a scanner with a relatively large quantity of focus positions may reduce a system response of the barcode scanner. For instance, if distance measurements are inaccurate (or otherwise not used), the barcode scanner may be configured to capture multiple images with the lens at multiple different focus positions in an attempt to identify a suitable focus position for the lens. In other words, the barcode scanner may revert to cycling through some or all of the relatively large quantity of focus positions to identify a suitable focus position of the lens. In some cases, cycling through a large quantity of focus positions (e.g., trying many focus positions) may be relatively time consuming and, as such, may reduce the system response of the barcode scanner (e.g., may reduce scanning snappiness).

Various aspects of the present disclosure generally relate to lens focusing in imaging environments and, more specifically, to a framework for comprehensive lens focusing in dual channel scanning systems. The framework for comprehensive lens focusing, as described herein, may provide for improved performance in dual channel scanning systems. For example, the present disclosure may provide for improved snappiness and robustness for dual channel scanning systems utilized in highly dynamic ranges of ambient light conditions (e.g., from 0k Lux to 100K lux).

In accordance with various aspects of the present disclosure, a multi-imager imaging apparatus (e.g., a dual channel scanning system), may select a lens focusing scheme based on the detectability of an aimer pattern. For example, the multi-imager imaging apparatus may project, during a first time occasion, an aimer pattern onto a target object within a field of view of a first imager of a multi-imager imaging engine included in the multi-imager imaging apparatus. The first imager may include a near-field imager or a far-field imager. The multi-imager imaging apparatus may also acquire a first image of the target object via the first imager during the first time occasion (e.g., to attempt to capture an image of the projected aimer pattern). The multi-imager imaging apparatus may then select a lens focusing scheme based on a detectability level of the aimer pattern in the first image. For example, the multi-imager imaging apparatus may then select the lens focusing scheme to determine a focus position for a lens in an imager of the multi-imager imaging engine. The imager may include the first imager or another imager in the multi-imager imaging engine. That is, the imager may include the near-field imager or the far-field imager. In various embodiments, selection of the lens focusing scheme is between a first lens focusing scheme associated with a location of the aimer pattern (e.g., a triangulation based focusing scheme) and a second lens focusing scheme associated with a predefined lens position (e.g., a default focusing scheme).

In various aspects of the present disclosure, the multi-imager imaging apparatus may select the first lens focusing scheme based on the detectability level of the aimer pattern satisfying a threshold. In other words, when the aimer can be detected, the multi-imager imaging apparatus may select the triangulation based focusing scheme for determination of the focus position for the lens. In various embodiments, to determine the focus position in accordance with the first lens focusing scheme, triangulation based on one or more look up tables (and the location of the aimer pattern) is conducted. That is, in accordance with various embodiments of the first lens focusing scheme, the lens is moved according to a lookup result, which is based on triangulation using the location of the aimer pattern. In various embodiments, a distance over which the lens is moved depends on a current position of the lens. In other words, the distance the lens is moved may correspond to a difference between a selected lens position and a current position of the lens.

In various embodiments of the present disclosure, the multi-imager imaging apparatus may select the second lens focusing scheme based on the detectability level of the aimer pattern failing to satisfy a threshold. In other words, when the aimer cannot be clearly detected (e.g., under various signal-to-noise ratio (SNR) criteria), the multi-imager imaging apparatus may select the default focusing scheme. In various embodiments, to determine a focus position in accordance with the second lens focusing scheme, a priority-based sequence is conducted. That is, the second lens focusing scheme may include moving the lens to a predefined focus position in accordance with a priority-based sequence. The multi-imager imaging apparatus may determine the sequence by ordering multiple candidate focus positions according to a respective priority associated with each candidate focus position. In such an example, a first focus position within the sequence may correspond to a candidate focus position with a highest priority among the multiple candidate positions. In various embodiments, the priority of a candidate focus position may be formed based on one or more criteria, such as a depth of field (DOF) coverage associated with the focus position, a distance the lens moves (e.g., a distance between the focus position and a current position of the lens), and a decoding status associated with one or more images acquired using the focus position (e.g., whether one or more previous images collected in accordance with the focus position were successfully decoded). In various embodiments, in accordance with the second lens focusing scheme, the lens is moved to a predefined focus position associated with a previously acquired image that was successfully decoded (e.g., a last or most recently acquired image that was successfully decoded). In various embodiments, the multi-imager imaging apparatus may move the lens to a predefined focus position (e.g., the first focus position in the predefined sequence or the predefined focus position associated with a previously acquired image that was successfully decoded) during the first time occasion. That is, the multi-imager imaging apparatus may move the lens to the predefined focus position and acquire the first image concurrently. In other words, the multi-imager imaging apparatus may move the lens to the predefined focus position while the first image is being acquired. In some examples, moving the lens to a predefined focus position based on priority (and/or while another image is being acquired) may increase a rate at which images are successfully decoded (e.g., may enable the scanner to capture decodable image relatively quickly), thereby increasing the snappiness and robustness of the multi-imager imaging apparatus.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "illuminator source" refers to one or more light generating hardware, devices, and/or components configured to produce an illumination within a field of view. Non-limiting examples of an illuminator source includes one or more light emitting diodes (LEDs), one or more lasers, and/or the like.

The term "near-field illuminator source" refers to an illuminator source configured to produce an illumination configured for illuminating a near-field of view associated with a near-field imager. In at least one example context, the near-field illuminator source is configured to produce an illumination in a wider field of view as compared to that of a far-field illuminator source.

The term "far-field illuminator source" refers to an illuminator source configured to produce an illumination configured for illuminating a far-field of view associated with a far-field imager. In at least one example context, the far-field illuminator source is configured to produce an illumination in a narrower field of view as compared to that of a near-field illuminator source.

The term "illumination" refers to one or more light rays produced by an illuminator source within a field of view. In various embodiments, illumination includes continuous illumination and/or pulsed illumination.

In at least one example context, continuous illumination includes one or more continuous streams of light produced by one or more corresponding illuminator sources.

In at least one example context, the illumination includes one or more pulses of light produced by one or more corresponding illuminator sources.

The term "near-field illumination" refers to illumination produced by a near-field illuminator. In some embodiments, the near-field illumination is associated with illumination of a near-field of view captured by a near-field imager.

The term "far-field illumination" refers to illumination produced by a far-field illuminator. In some embodiments, the far-field illumination is associated with illumination of a far-field of view captured by a far-field imager.

The term "light ray" refers to light traveling in any one direction in a straight line. In at least one example context, a beam of light includes a set of light rays produced from an illuminator source.

The term "imager" refers to one or more components configured for capturing an image representing a particular field of view. In at least one example context, an imager includes at least one optical component (e.g., at least one lens and/or at least one associated housing) defining a particular field of view. Additionally, or alternatively, in at least one example context, an imager includes an image sensor configured to output an image based on light that engages with the image sensor, such as via the optical components. The term "image" refers to electronic data generated by an imager that embodies a captured representation of the field of view of the imager.

The term "near-field imager" refers to an imager configured for acquiring an image of a near-field of view. In at least one context, the near-field imager includes at least one near-field optical component defining the near-field of view, and a near-field image sensor. The term "near-field image" refers to electronic data generated by the near-field imager that embodies a captured representation of the near-field of view.

The term "far-field imager" refers to an imager configured for acquiring an image of a far-field of view. In at least one context, the far-field imager includes at least one far-field optical component defining the far-field of view, and a far-field image sensor. The term "far-field image" refers to electronic data generated by the far-field imager that embodies a captured representation of the far-field of view.

The term "image sensor" refers to one or more components configured to generate an image represented by a data object based on light incident on the image sensor. In some such example contexts, an image sensor converts light waves that interact with the image sensor into signals representing an image output by the sensor.

The term "image capture optics" refers to one or more lenses and/or one or more corresponding enclosures defining an aperture to receive reflected light. In some embodiments, image capture optics are associated with an image sensor, such that the image capture optics combined with the image sensor defines a field of view captured utilizing such components. It should be appreciated that image capture optics may include one or more lenses constructed of any of a number of materials, including, without limitation, a 3-glass lens, a 3-plastic lens, or the like.

The term "lens" refers to any transmissive optical device that focuses or disperses a light ray by means of refraction. In at least one context, a lens may include any lens that focuses light received via an input face of the lens to a particular focal point.

The term "input face" with respect to a lens refers to a portion of the lens that is intended to receive light.

The term "output face" with respect to a lens refers to a portion of the lens that from which light received by the lens is projected.

The term "projection optics" refers to one or more lenses and/or one or more corresponding enclosures configured to receive light produced by an illuminator source and produce an illumination of a predefined illumination pattern from received light. Projection optics may be referred to herein as illumination lens. In at least one example context, one or more physical properties of projection optics defines the illumination pattern associated with the projection optics, for example based on a defined shape and/or curvature of the projection optics.

The term "imaging engine" refers to an apparatus including at least one imager configured to enable capturing of image data objects (e.g., images) associated with various focus ranges and/or fields of view. In some embodiments, an imager of an imaging engine includes a sensor, illuminator source, and image capture optics defining a field of view. Additionally, or alternatively, in some embodiments, an imaging engine includes one or multiple illuminator sources. In some such embodiments, an illuminator source is associated with one or more imagers. In at least one example context, the imaging engine includes at least a far-field imager or a near-field imager.

The term "multi-imager imaging engine" refers to an apparatus including multiple imagers configured to enable capturing of image data objects (e.g., images) associated with various focus ranges and/or fields of view. In some embodiments, an imager of a multi-imager imaging engine includes a sensor, illuminator source, and image capture optics defining a field of view. Additionally, or alternatively, in some embodiments, a multi-imager imaging engine includes multiple illuminator sources, in which an illuminator source is associated with one or more imagers. In at least one example context, the multi-imager imaging engine includes at least a far-field imager and a near-field imager.

The term "imaging apparatus" refers to an apparatus including at least one imaging engine configured to enable capturing of image data objects (e.g., images) associated with various focus ranges and/or fields of view. In at least one example context, an imaging apparatus is a scanner, such as a barcode scanner.

The term "multi-imager imaging apparatus" refers to an apparatus including at least one multi-imager imaging engines configured to enable capturing of image data objects (e.g., images) associated with various focus ranges and/or fields of view. In at least one example context, a multi-imager imaging apparatus is a scanner, such as a barcode scanner.

The term "projecting" refers to directing light by means of an optic, such as a lens. In at least one example context, projecting light includes directing the light from an illuminator source onto a target object.

The term "aimer" refers to one or more components of an apparatus, which are configured to project an illumination used for aligning the apparatus with a target object. In at least one example context, an aimer is used for aligning an apparatus with a target object for capturing an image of the target object. In at least one example context, an aimer includes an illuminator source (e.g., one or more light generating elements) that produce light utilized to project an illumination used for aligning an apparatus to a target object. Additionally, in at least one example context, an aimer includes at least one optical component (e.g., at least one lens and/or at least one associated housing) configured to receive light produced by an illuminator source and produce an illumination of a predefined illumination pattern from received light. The predefined illumination pattern is referred to herein as an aimer pattern. In at least one example context, the aimer pattern provides a visual guide or marker for aligning an apparatus with a target object. In various embodiments, the aimer pattern varies based on one or more characteristics of the aimer, such as the illuminator source and/or projection optics. Some non-limiting examples of an aimer pattern include a circle, a thin line, crosshairs, a dot matrix, or the like. In at least one example context, an aimer may be configured to project a pattern or outline around a target object. In such an example context, the aimer pattern may include the pattern or outline projected around the target object.

The term "target object" refers to a surface onto which an aimer pattern is projected. In at least one example context, a target object includes any surface or material that interacts with the aimer pattern by redirecting at least a portion of the aimer pattern, for example, in the direction of an imager. Redirection of light may be referred to as reflection. In at least one example context, a target object includes a surface displaying visual indicia. In some non-limiting examples, visual indicia is displayed on a target object via printing, engraving embossing, debossing, etching, projection, digital display, tactile markings, or holograms.

The term "visual indicia" refers to a visual pattern that conveys encoded data. In at least one example context, visual indicia includes a visual pattern that conveys encoded data in a machine-readable format. A non-limiting example of visual indicia includes a barcode.

The term "field of view" refers to the extent an optical device, such as an imager, can capture an image at a given moment. In at least one example context, the field of view includes a physical area that can be imaged by a lens system. In at least one example context, the field of view includes a portion of an area that fills an imager sensor. In various embodiments, a field of view may include a horizontal or vertical field of view. In at least one example context, a horizontal field of view is defined in terms of a horizontal angle and a distance between a left edge and a right edge of the horizontal field of view. In at least one example context, a field of view of an imager depends on one or more components of the imager such as a focus length of a lens in the imager.

The term "reference position," and the like, refers to a position of calibrated point. In various embodiments, the reference point may be defined in terms of one or more coordinates.

The term "acquiring an image," and the like, refers to the process of capturing an image using a device, such as an imager.

The term "lens focusing scheme" refers to one or more operations performed by a device to focus a lens. In at least one example context, a lens focusing scheme includes one or more operations used to select a focus position for a lens.

The term "focus position for a lens," and the like, refers to a location within an imager at which a lens is positioned to capture an image of a target object. In various embodiments, a focus position for a lens corresponds to a particular distance between the lens and a target object.

The term "location of an aimer pattern" refers to a position of the one or more pixels in an image that correspond to a location from which an aimer pattern is reflected. In at least one example context, the location of an aimer pattern is based on an area of a surface onto which the aimer pattern is being projected. For example, the light of an aimer pattern which is reflected off of a surface can be captured (e.g., detected) via an imager in the form of an image. In such embodiments, the location of the aimer pattern corresponds to a position of one or more pixels in the image that correspond to the reflected light of the aimer pattern. In various embodiments, the location of an aimer pattern may be defined in terms of one or more coordinates.

The term "lookup table" refers to a data structure configured to map input values to corresponding output values. In various embodiments, a lookup table includes a tabular representation of one or more functions or a set of relationships between input and output data.

The term "communicatively coupled" refers to a state of enabled transmission of data signals between components, devices, or systems, in a single direction or bi-directionally.

Exemplary Systems, Apparatuses, and Methods

FIG. 1 illustrates an example multi-imager imaging engine in accordance with at least one example embodiment of the present disclosure. More specifically, as illustrated in FIG. 1, the example multi-imager imaging engine is embodied by a multi-imager imaging engine 100. The multi-imager imaging engine 100 includes multiple imagers, namely a near-field imager and a far-field imager, configured for capturing image data objects in a near-field of view associated with the near-field imager and a far-field of view associated with the far-field imager. In at least one example context, the multi-imager imaging engine 100 is configured for capturing images for purposes of barcode reading at different ranges, such as a close-range using the near-field imager and a far-range using the far-field imager.

As illustrated, the multi-imager imaging engine 100 includes near-field image capture optics 104A. The near-field capture optics 104A may be embodied by one or more lenses and/or other optical components configured to enable light to traverse through and interact with a corresponding image sensor, namely a near-field image sensor 102A. In this regard, the near-field image capture optics 104A may define a particular field of view that may be captured by the near-field image sensor 102A. In some embodiments, the near-field image capture optics 104A defines a near-field of view associated with a first focal range, such that objects located at and/or within a determinable offset from the first focal range may be clearer in images captured by the near-field image sensor 102A compared to other objects located outside of the first focal range.

Additionally, as illustrated in FIG. 1, the multi-imager imaging engine 100 includes far-field image capture optics 104B. The far-field image capture optics 104B may be embodied by one or more lenses and/or other optical components configured to enable light to traverse through and interact with a corresponding image sensor, namely a far-field image sensor 102B. In this regard, the far-field image capture optics 104B may define a second field of view that may be captured by the far-field image sensor 102B. In some embodiments, the far-field image capture optics 104B defines a far-field of view that is associated with a second focal range, such that objects located at and/or within a determinable offset from the second focal range may be clearer in images captured by the far-field image sensor 102B compared to other objects located outside of the second focal range. In some such embodiments, the near-field of view is wider than the far-field of view, such that the captured data represents more of the environment within view of the multi-imager imaging engine 100. The far-field of view may be narrower than the near-field of view, and focused on a further range to enable clearer capture of objects located at a greater range than objects that can be captured clearly in the near-field of view.

In some embodiments, an imager is associated with one or more components for producing an illumination configured for illuminating the field of view defined by the imager. For example, as illustrated in FIG. 1, the multi-imager imaging engine 100 includes the near-field illuminator source 106B and corresponding near-field projection optics 108B. The near-field illuminator source 106B is configured to produce light in the direction of the near-field projection optics 108B. This light is refracted through the near-field projection optics 108B to produce a near-field illumination, which may be produced in a pattern based on the configuration and design of the near-field projection optics 108B. In this regard, the illumination produced by light exiting the near-field projection optics 108B may illuminate a particular field of view, such as the near-field of view capturable by the near-field image sensor 102A. It should be appreciated that in some embodiments, the near-field illuminator source 106B and/or near-field projection optics 108B may be designed such that the near-field illumination specifically illuminates the near-field of view, and may affect the functioning of the far-field image sensor 102B without negatively affecting the functioning of the near-field image sensor 102A. For example, due at least in part to the close proximity between the components, reflected light may interact with the far-field image sensor 102B and negatively affect the images created via far-field image sensor 102B.

Additionally, as illustrated in FIG. 1, the multi-imager imaging engine 100 includes the far-field illuminator source 106A and corresponding far-field projection optics 108A. The far-field illuminator source 106A is configured to produce light in the direction of the far-field projection optics 108A. This light is refracted through the far-field projection optics 108A to produce a far-field illumination, which may be produced in a desired pattern based on the configuration and design of the far-field projection optics 108A. In this regard, the far-field illumination may illuminate a particular field of view, such as the far-field of view capturable by the far-field image sensor 102B. It should be appreciated that the far-field illuminator source 106A and/or far-field projection optics 108A may be designed such that the far-field illumination specifically illuminates the far-field of view without producing sufficient reflections to negatively impact the operations of the near-field image sensor 102A and/or far-field image sensor 102B.

Additionally, the multi-imager imaging engine 100 includes an aimer illuminator source 110. The aimer illuminator source 110 is configured to produce light in the direction of the aimer projection optics 112. For example, the aimer illuminator source includes one or more laser diodes and/or one or more high intensity LEDs configured to produce sufficiently powerful and/or concentrated light. The light is refracted through the aimer projection optics 112 to produce an aimer illumination, which may be produced in a desired pattern based on the configuration and design of the aimer projection optics 112. In one example context, for purposes of barcode scanning for example, the aimer pattern may be produced as a thin line (e.g., a laser line pattern).

The multi-imager imaging engine 100 further includes a protective window 114. The protective window 114 includes one or more optical components configured to enable produced light to exit the multi-imager imaging engine 100, and incoming light to be received through the near-field image capture optics 104A and the far-field image capture optics 104B to interact with the corresponding image sensors (e.g., the near-field image sensor 102A and the far-field image sensor 102B). In some contexts, the protective window 114 reflects at least a portion of the illumination projected by the far-field projection optics 108A and/or near-field projection optics 108B, and which may interact with the near-field image sensor 102A and/or the far-field image sensor 102B through light leak or through the corresponding image capture optics (e.g., the near-field image capture optics 104A and/or the far-field image capture optics 104B). For example, at least a portion of the near-field illumination may be reflected towards the far-field image sensor 102B, and negatively affect the operation of the far-field image sensor 102B if triggered when an illumination pulse is occurring. In at least one example context, the far-field illuminator source 106A produces light that is concentrated and/or otherwise sufficiently designed such that the far-field illumination produced by the far-field projection optics 108A is not sufficiently reflected to negatively affect the near-field image sensor 102A.

It should be appreciated that, in other embodiments, a multi-imager imaging engine may include any number of image capture optics, image sensors, illuminator sources, and/or any combination thereof. In this regard, the engine may be extended to capture any number of field of views, which may each be associated with a corresponding illuminator designed for specifically illuminating a corresponding field of view.

In some imaging engines, a distance measurement can be conducted using triangulation based on an aimer pattern projected from the imaging engine. For example, the imaging engine may project the aimer pattern onto a target object, which may reflect at least a portion of the aimer pattern back towards the imaging engine. In such an example, the imaging engine may detect the reflected portion of the aimer pattern and may use triangulation to determine the distance between the imaging engine and the target object based on the detected portion of the aimer pattern. However, in relatively high ambient light conditions, such as outdoor sunlight conditions, detected portion of the aimer pattern may not be distinguishable from other light reflected off other objects within the field of view of the imaging engine. That is, the aimer pattern may not be identified in the image of the target object. In such cases, distance measurements based on the aimer pattern may be inaccurate and unreliable. That is, if the aimer pattern is not sufficiently distinguishable in an image of a target object, a measurement of the distance between the imaging engine and the target object may be inaccurate, which may lead to an inaccurate selection of a focus position for one or more lenses in the imaging engine.

In accordance with various embodiments of the present disclosure, imaging engines, such as the multi-imager imaging engine 100, may select a focusing scheme based on a detectability level of an aimer pattern in an image. Accordingly, the present disclosure may provide for comprehensive lens focusing for imagers in various field conditions (e.g., a highly dynamic range of conditions, such as conditions with 0 Lux to 100K lux). For example, in relatively low ambient light conditions, the aimer pattern may be sufficiently distinguishable in an image of a target object. In various embodiments, the aimer pattern may be sufficiently distinguishable in an image of a target object if a detectability level of the aimer pattern satisfies a threshold. In such conditions, in accordance with various embodiments of the present disclosure, the multi-imager imaging engine 100 may select a first focusing scheme, in which a focus position for a lens is determined via triangulation based on a location of the aimer pattern. In relatively high ambient light conditions, the aimer pattern may not be sufficiently distinguishable in an image of a target object. In various embodiments, the aimer pattern may not be sufficiently distinguishable in an image of a target object if a detectability level of the aimer pattern fails to satisfy the threshold. In such conditions, in accordance with various embodiments of the present disclosure, the multi-imager imaging engine 100 may select a second focusing scheme, in which a focus position for a lens is determined based on a predefined lens position. Utilization of one or more comprehensive lens focusing techniques, as described herein, may increase a rate at which the multi-imager imaging engine 100 selects a suitable focus position for a lens (e.g., a focus position in which a target object in an image collected using the lens is clear enough to be successfully decoded). Accordingly, the one or more comprehensive lens focusing techniques, as described herein, may also increase a rate at which the multi-imager imaging engine 100 successfully decodes images.

In some embodiments, the multi-imager imaging engine 100 includes one or more processing components (e.g., a processor and/or other processing circuitry) for controlling activation of one or more components of the multi-imager imaging engine 100. For example, in at least one example embodiment, the multi-imager imaging engine 100 includes a processor configured for selecting a lens focusing scheme, determining a focus position for a lens accordance with the selected scheme, timing illumination pulses of the near-field illuminator source 106B and/or far-field illuminator source 106A, and/or controlling the exposing of the near-field image sensor 102A and/or far-field image sensor 102B. In some such contexts, the processor is embodied by any one of a myriad of processing circuitry implementations, for example as a FPGA, ASIC, microprocessor, CPU, and/or the like. In at least some embodiments, the processor may be in communication with one or more memory devices having computer-coded instructions enabling such functionality when executed by the processors. In some embodiments, it should be appreciated that the processor may include one or more sub-processors, remote processors (e.g., "cloud" processors) and/or the like, and/or may be in communication with one or more additional processors for performing such functionality. For example, in at least one embodiment, the processor may be in communication, and/or operate in conjunction with, another processor within an imaging apparatus, for example the processor 202 as depicted and described with respect to FIG. 2.

Figure 2:
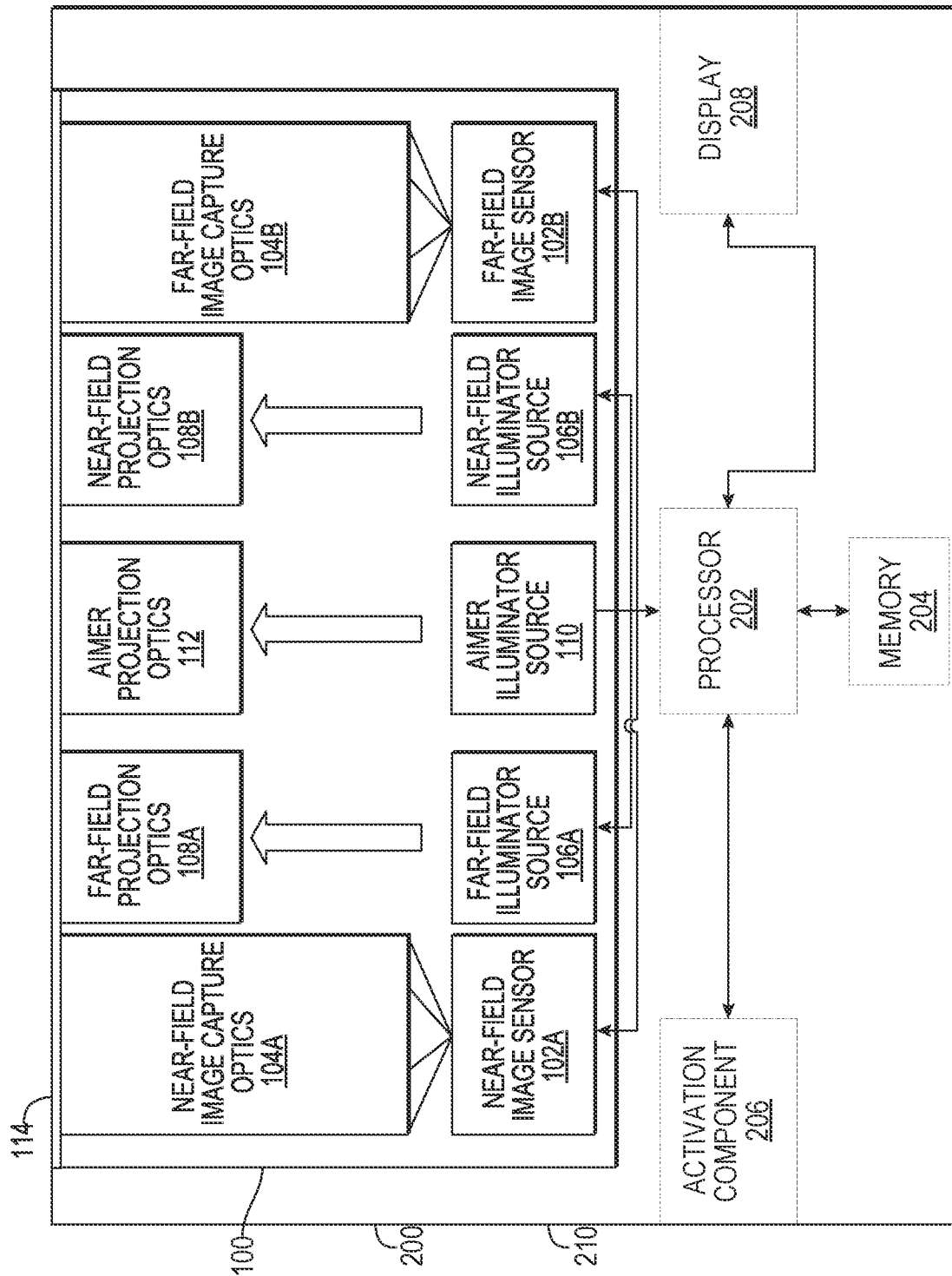
FIG. 2 illustrates a block diagram of an example multi-imager imaging apparatus, in accordance with at least one example embodiment of the present disclosure.

FIG. 2 illustrates an example multi-imager imaging apparatus (e.g., a multi-imager imaging apparatus 200), in accordance with at least one example embodiment of the present disclosure. As illustrated in FIG. 2, the multi-imager imaging apparatus 200 includes an apparatus chassis 210 for housing the various components of the multi-imager imaging apparatus 200. In this regard, it should be appreciated that the apparatus chassis 210 may be embodied in any of a myriad of chassis designs, using any of a myriad of materials, and/or the like, suitable to position the various components of the multi-imager imaging apparatus 200 for operation. In at least one example context, the apparatus chassis 210 may be embodied as a handheld apparatus chassis, wearable chassis, and/or the like.

The multi-imager imaging apparatus 200 includes the multi-imager imaging engine 100 as described above with respect to FIG. 1. The multi-imager imaging apparatus 200 further includes a processor 202. The processor 202 (and/or one or more other co-processors and/or processing circuitry assisting and/or otherwise associated with the processor 202) may provide processing functionality to the multi-imager imaging apparatus 200. In this regard, the processor 202 may be embodied in any one of a myriad of ways and may, for example, include one or more processing devices configured to perform independently. Additionally, or alternatively, the processor may include one or more processors configured to operate in tandem via a bus to enable independent execution of instructions, pipelining, and/or multi-threading, and/or the like. The use of the terms "processor," "processing module," and/or processing circuitry" may be understood to include a single-core processor, a multi-core processor, multiple processors, microprocessor, other central processing unit ("CPU"), and/or one or more remote or "cloud" processors. In other embodiments, the processor 202 is configured as one or more field-programmable gate arrays ("FPGAs"), application-specific integrated circuits ("ASICs"), and/or the like.

In at least one example embodiment, the processor 202 is configured to provide functionality for operating one or more components of the multi-imager imaging apparatus 200. For example, the processor 202 may be configured for activating the far-field illuminator source 106A, the near-field illuminator source 106B, and/or the aimer illuminator source 110. Additionally, or alternatively, in some embodiments, the processor 202 is configured for activating the near-field image sensor 102A and/or the far-field image sensor 102B to expose the corresponding image sensor, and/or for reading out the captured data to generate an image based on the data captured during exposure. Additionally, or alternatively, in some embodiments, the processor 202 is configured to process one or more captured images, for example based on one or more image processing tasks. In one such example context, the processor 202 is configured to perform one or more operations to attempt to detect and decode visual indicia, such as 1D and/or 2D barcodes, from a captured image. In this regard, the processor 202 may be configured to utilize a visual indicia parsing algorithm and/or a visual indicia decoding algorithm to provide such functionality.

Additionally, or alternatively, the multi-imager imaging apparatus 200 includes activation component 206. The activation component 206 may include hardware, software, firmware, and/or a combination thereof, configured to indicate initiation (and/or termination) of desired functionality by the user. For example, the activation component 206 may transmit an activation signal to cause the processor 202 to begin operation of the multi-imager imaging apparatus 200, for example to begin illumination by one or more of the illuminator sources (e.g., the far-field illumination source 106A and/or the near-field illumination source 106B), and/or capture by the near-field image sensor 102A and/or the far-field image sensor 102B, as described herein. Additionally, or alternatively, the activation component 206 may transmit a deactivation signal to the processor 202 to terminate the corresponding functionality, for example to cease scanning via one or more of the illuminators and/or one or more of the image sensors. In some embodiments, the activation component 206 is embodied by one or more buttons, triggers, and/or other physical components on the body of the apparatus chassis 210. For example, in at least one example context, the activation component 206 is embodied by one or more "trigger" components that, when engaged by an operator (e.g., when an operator squeezes the trigger), transmits a signal to the processor 202 to initiate corresponding functionality. In some such embodiments, the activation component may transmit a deactivation signal to the processor 202 to cease such functionality when the component is disengaged by the operator (e.g., when the operator releases the trigger). Additionally, or alternatively, in one or more embodiments, the activation component 206 is embodied without any components for direct engagement by an operator. For example, the activation component 206 may be embodied by hardware and/or software, or a combination thereof, for detecting the multi-imager imaging apparatus 200 has been raised and/or positioned to a predefined "scanning" position, and/or lowered from that position to trigger deactivation.

Additionally, or alternatively, in one or more embodiments, the multi-imager imaging apparatus 200 further includes a display 208. The display 208 may be embodied by a LCD, LED, and/or other screen device configured for data provided by one or more components of the multi-imager imaging apparatus 200. For example, in some embodiments, the display 208 is configured for rendering a user interface comprising text, images, control elements, and/or other data provided by the processor 202 for rendering. In some embodiments, for example, the display 208 is embodied by an LCD and/or LED monitor integrated with the surface of the apparatus chassis 210 and visible to an operator, for example to provide information decoded from a barcode and/or associated with such information decoded from a barcode. In one or more embodiments, the display 208 may be configured to receive user engagement, and/or may transmit one or more corresponding signals to the processor 202 to trigger functionality based on the user engagement. In some such embodiments, the display 208 to provide user interface functionality embodying activation component 206, for example to enable an operator to initiate and/or terminate scanning functionality via interaction with the user interface.

Additionally, or alternatively, in one or more embodiments, the multi-imager imaging apparatus 200 further includes a memory 204. The memory 204 may provide storage functionality, for example to store data processed by the multi-imager imaging apparatus 200 and/or instructions for providing the functionality described herein. In some embodiments, the processor 202 may be in communication with the memory 204 via a bus for passing information among components of the apparatus, and/or for retrieving instructions for execution. The memory 204 may be non-transitory and may include, for example, one or more volatile and/or non-volatile memories. In other words, for example, the memory 204 may be an electronic storage device (e.g., a computer readable storage medium). The memory 204 may be configured to store information, data, content, applications, instructions, or the like, for enabling the multi-imager imaging apparatus 200 to carry out various functions in accordance with example embodiments of the present disclosure. In some embodiments, the memory 204 includes computer-coded instructions for execution by the processor 202, for example to execute the functionality described herein and/or in conjunction with hard-coded functionality executed via the processor 202. For example, when the processor 202 is embodied as an executor of software instructions, the instructions may configure the processor 202 to perform the algorithms and/or operations described herein when the instructions are executed.

The multi-imager imaging engine 100 may include multiple imagers, such as a near-field imager that includes at least the near-field image capture optics 104A and the near-field image sensor 102A, and a far-field imager that includes at least the far-field image capture optics 104B and the far-field image sensor 102B. The near-field imager and the far-field imager may include one or more lenses. The multi-imager imaging apparatus 200 may select a focus position for the one or more lenses included in the near-field imager and/or the far-field imager in accordance with one or more aspects of the present disclosure.

For example, in accordance with various embodiments of the present disclosure, the multi-imager imaging apparatus 200, may select a focusing scheme based on a detectability level of an aimer pattern in an image. In at least one example embodiment, the multi-imager imaging apparatus 200 may use an aimer to project, during a first time occasion, an aimer pattern onto a target object within a field of view of a first imager of a multi-imager imaging engine 100 (e.g., the near-field imager or the far-field imager). The aimer may include at least the aimer illuminator source 110 and the aimer projection optics 112. The multi-imager imaging apparatus 200 may acquire an image of the target object via the first imager while the aimer pattern is projected onto the target object. For example, the multi-imager imaging apparatus 200 may acquiring a first image of the target object during the first time occasion. The first imager may include the near-field imager and/or the far-field imager. For example, the multi-imager imaging apparatus 200 may use the near-field imager, or far-field imager, or the near-field and the far-field imager together to determine a focus position for a lens in the multi-imager imaging apparatus 200. In various embodiments, the first imager may be a global shutter imager or a rolling shutter imager.

The multi-imager imaging apparatus 200 may select a lens focusing scheme based on a detectability level of the aimer pattern in the first image. In various embodiments, selection of the lens focusing scheme is between a first lens focusing scheme associated with a location of the aimer pattern and a second lens focusing scheme associated with a predefined lens position. The multi-imager imaging apparatus 200 may determine a focus position for a lens in the multi-imager imaging engine in accordance with the selected lens focusing scheme. The lens may be included in the near-field imager or the far-field imager. In various embodiments, the focus position can be continuous or classified into discrete steps.

That is, the lens may be included in the first imager or second (different) imager of the multi-imager imaging apparatus 200. In some examples, selection of a lens focusing scheme based on the detectability level of an aimer pattern, as described herein, may lead to improved performance of the multi-imager imaging apparatus 200. For example, selection of a lens focusing scheme based on the detectability level of an aimer pattern, as described herein may increase a rate at which the multi-imager imaging apparatus 200 successfully decodes visual indicia included in the target object. While FIGS. 1 and 2 depict a multi-imager imaging engine, it should be understood that various embodiments of the present disclosure may be implemented in an imaging engine with one or more imagers.

Figure 3:
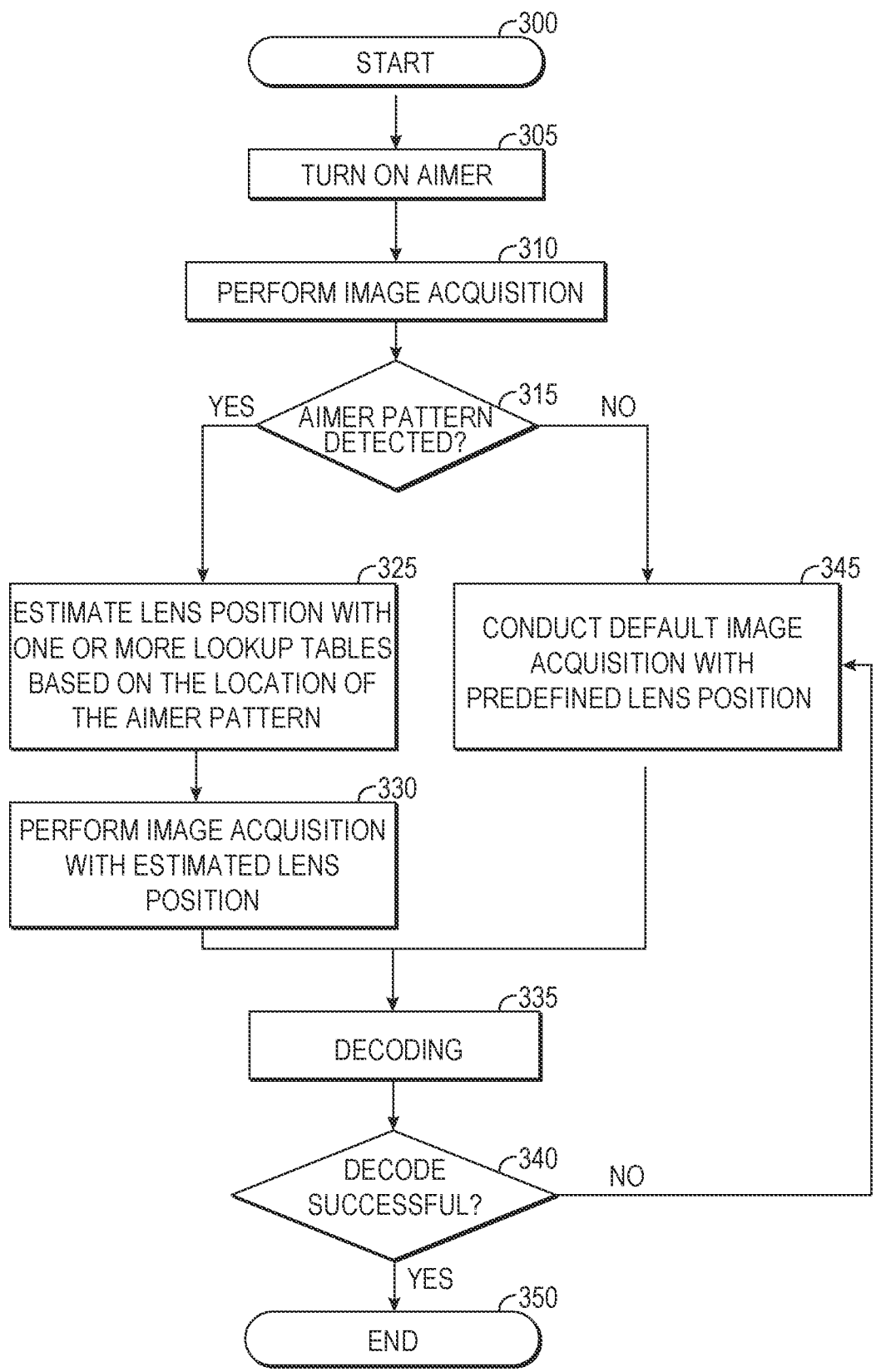
FIG. 3 illustrates a flowchart depicting example operations of a process for lens focusing in a multi-imager environment, in accordance with at least one example embodiment of the present disclosure.

FIG. 3 illustrates a flowchart depicting example operations of a process for lens focusing in an imaging environment (e.g., a single imager imaging environment, a multi-imager environment) in accordance with at least one example embodiment of the present disclosure. For example, the process includes one or more comprehensive lens focusing techniques, as described herein. As illustrated in FIG. 3, an imaging apparatus (e.g., including a single imaging engine or a multi-imager imaging engine), may use one or more aspects of the process to select a focusing scheme based on a detectability level of an aimer pattern in an image.

In various embodiments, at 300, the process of FIG. 3 may start. The start of the process may be initiated by a user of the imaging apparatus. Additionally, or alternatively, the imaging apparatus may autonomously start the process. In some non-limiting examples, the imaging apparatus may autonomously start the process in response to a trigger, in accordance with a predefined periodicity, or in response to the expiration of one or more timers.

At 305, the aimer is turned on. The aimer may be turned on by the user or the imaging apparatus may autonomously turn on the aimer. In some non-limiting examples, the imaging apparatus may autonomously turn on the aimer in response to a trigger, in accordance with a predefined periodicity, or in response to the expiration of one or more timers. In various embodiments, the imaging apparatus may autonomously turn on the aimer in response to a timer that is initiated in response to successfully decoding an image. In some such embodiments, a duration of the timer may correspond to a threshold duration over which the imaging apparatus operates without successfully decoding an image. In other words, if the imaging apparatus fails to successfully decode an image and the timer expires, the aimer may turn on (e.g., so that the imaging apparatus may capture an image of the aimer pattern for a distance measurement). In various embodiments, at 305, the aimer may project an aimer pattern onto a target object within a field of view of a first imager of one or more imagers included in an imaging engine (e.g., included in the imaging apparatus). The first imager may include a near-field imager or a far-field imager of the imaging engine.

At 310, the imaging apparatus may acquire a first image of the target object via the first imager. In various embodiments, the imaging apparatus may acquire the first image concurrently with the projection of the aimer pattern onto the target object. For example, one or more operations associated with 305 and 310 may be performed during a first time occasion.

In various embodiments, at 315, the imaging apparatus may determine whether the aimer pattern is detected in the first image. For example, the imaging apparatus may determine whether a detectability level of the aimer pattern in the first image satisfies a threshold. In various embodiments, the threshold may be based on one or more characteristics of the aimer and/or a region of interest (ROI). In other words, the determination at 315 may be based on an intensity difference associated with the aimer pattern and an average ROI. In various embodiments, the detectability level is based on an average ROI and an intensity difference between one or more pixels associated with the aimer pattern in the first image and one or more other pixels in the first image. In various embodiments, the imaging apparatus may acquire a background image. The background image may be indicative of the environment of the target object. In some such embodiments, the imaging apparatus may perform one or more image processing operations using the background image, for example, to improve a detectability of the aimer pattern in the first image. For example, the imaging apparatus may subtract the background image from the first image (or one or more other images).

Additionally, as illustrated in the example of FIG. 3, the imaging apparatus may select a lens focusing scheme based the determination at 315 of whether the aimer pattern is detected in the first image. In various embodiments, selection of the lens focusing scheme is between a first lens focusing scheme associated with a location of the aimer pattern and a second lens focusing scheme associated with at least one predefined lens position.

In some examples, at 315, the imaging apparatus may determine that the aimer pattern is detected in the first image (e.g., may determine "yes"). For example, the imaging apparatus may determine that the detectability level of the aimer pattern in the first image satisfies the threshold. In such an example, the imaging apparatus may determine a focus position for a lens in the imaging engine (e.g., a lens in near-field imager or a lens in the far-field imager) in accordance with the first lens focusing scheme. The first focusing scheme may include determining the focus position based on the location of the aimer pattern. For example, in accordance with the first lens focusing scheme, the imaging apparatus may identify the location of the aimer pattern (e.g., based on the first image) and may determine, using one or more lookup tables, the focus position for the lens based on the location of the aimer pattern.

In some examples of the first lens focusing scheme, the imaging apparatus may measure an aimer offset. In various embodiments, to measure (e.g., estimate, determine) the aimer offset, the multi-imager managing apparatus may identify the location of the aimer pattern in the first image. The location of the aimer pattern may be associated with a location from which an aimer pattern is reflected. In various embodiments, the location of the aimer pattern may include a location of one or more pixels in the image that correspond to reflected light of the aimer pattern. In other words, the location of the aimer pattern may correspond to the location of the aimer pattern pixels in the first image. In various embodiments, the aimer offset corresponds to a first distance between the location of the aimer pattern and one or more reference points. In various embodiments, a reference point is based on a calibration performed at one or more known fixed distances. In other words, in various embodiments, the one or more reference points are one or more calibrated data points. In various embodiments, the aimer offset may be determined based on a pixel offset between the aimer pattern pixels (e.g., the one or more pixels in the image corresponding to the aimer pattern) and one or more reference pixels (e.g., one or more other pixels in the image corresponding to the one or more reference points). In such an example, the pixel offset may be used to determine a distance between a left edge of the field-of-view of the imager and the location of the aimer pattern in space (e.g., a parameter "t"), which may then be used to determine the aimer offset and/or a second distance between the imaging engine and the target object.

At 325, the imaging engine may estimate the focus position for the lens (e.g., a lens position) with one or more lookup tables using the second distance. For example, the imaging apparatus may estimate, using a first lookup table of the one or more lookup tables, the second distance between the imaging engine and the target object. In such an example, the second distance is based on the location of the aimer pattern. Additionally, in various embodiments, the imaging apparatus may determine, using a second lookup table, the focus position for the lens based on the second distance. In various embodiments, the first lookup table and the second lookup table may be merged into a single lookup table (e.g., one or more functions associated with the first lookup table and one or more functions associated with the second lookup table may be combined in a single lookup table). In other words, two lookup tables may be combined into one table, from which the aimer position may directly map to a lens position (e.g., the focus position).

In various embodiments, the one or more lookup tables may be associated with the first imager or the second imager. For example, the imaging apparatus may be configured with one or more lookup tables associated with the near-field imager and one or more lookup tables associated with the far-field imager. In various embodiments, a lookup table may be associated with an imager and/or one or more focus positions of a lens in the imager. For example, an imager (e.g., the near-field imager, the far-field imager) may be associated with a single lookup table or multiple lookup tables in which a lookup table (e.g., each lookup table) is associated with a respective focus position. Accordingly, the first lookup table and/or the second lookup table may depend on whether the first imager is the near-field imager or the far-field imager (e.g., whether the first image was captured using the near-field imager or the far-field imager). In some such embodiments, the second lookup table may depend on whether the lens is the near-field imager or the far-field imager (e.g., whether the first image was captured using the near-field imager or the far-field imager).

In various embodiments, the imaging apparatus may select an imager of the imaging engine based on the second distance. For example, the second distance may be such that a near-field focus position is suitable for capturing a relatively clear (e.g., a decodable) image of the target object. In such an example, the imaging apparatus may select the near-field imager. In some other examples, the second distance may be such that a far-field focus position is suitable for capturing a relatively clear (e.g., a decodable) image of the target object. In such an example, the imaging apparatus may select the far-field imager. In various embodiments, selection of the focus position is based on the selected imager.

In some examples, the multi-image imaging apparatus may determine multiple focus positions for the lens. For example, the imaging apparatus may determine, using the one or more lookup tables, the focus position and a second focus position for the lens based on the location of the aimer pattern corresponding to an intermediate focus position between the focus position and the second focus position. In other words, the second distance may be such that an intermediate focus position between two focus positions may be suitable for capturing a relatively clear an image of the target object. In one non-limiting example, the second distance may be such that a suitable focus position corresponds to an intermediate focus position between a mid-focus position in the far-field imager and a far-focus position (or a near-focus position) of the far-field imager. In various embodiments, the imaging apparatus may acquire multiple images (e.g., two images) using the focus position and the second focus position. For example, imaging apparatus may acquire an image of the target object using the lens in accordance with the focus position and may acquire another image of the target object using the lens in accordance with the second focus position. In some examples, selecting multiple (e.g., two) focus positions for the lens may increase a depth of field associated with the imaging apparatus.

At 330, the imaging apparatus may perform image acquisition with the estimated lens position (e.g., the focus position determined using the one or more lookup tables). For example, the imaging apparatus may acquire a second image of the target object using the lens in accordance with the focus position.

At 335, the imaging apparatus may perform decoding of the second image. For example, the imaging apparatus may perform one or more operations to decode visual indicia within the second image.

At 340, the imaging apparatus may determine whether the decoding at 335 was successful. In some examples, the imaging apparatus may determine that decoding at 335 was successful (e.g., may determine "yes" at 340). In such examples, at 350, the process may end. In some other examples, the imaging apparatus may determine that decoding at 335 failed (e.g., may determine "no" at 340). In some such examples, the imaging apparatus may determine to conduct the default image acquisition with a predefined lens position (e.g., at 345). For example, in response to a failure to successfully decode the visual indicia within the second image, the imaging apparatus may determine a second focus position for the lens in accordance with the second lens focusing scheme. That is, the imaging apparatus may determine to conduct the default image acquisition at 345 (e.g., in accordance with the second lens focusing scheme) in response to a failure to detect the aimer pattern in the first image (e.g., in response to determining "no" at 315) and/or a failure to successfully decode visual indicia in the second image (e.g., in response to determining "no" at 340). In some other examples, in response to a failure to successfully decode the visual indicia within the second image, the imaging apparatus may determine a third focus position for the lens, which may be relatively close to the focus position. For example, the imaging apparatus may determine one or more focus positions that are relatively close to the focus position and selected the third focus position from among the one or more focus positions. In some such examples, the imaging apparatus may collect an image using the lens in accordance with the third focus position. In some examples, in response to a failure to decode the image, the imaging apparatus may determine the second focus position for the lens in accordance with the second lens focusing scheme.

In various embodiments, at 315, the imaging apparatus may select the second lens focusing scheme based on the detectability level of the aimer pattern failing to satisfy the threshold. Accordingly, the imaging apparatus may determine the focus position for the lens is in accordance with the second lens focusing scheme.

At 345, the imaging apparatus may conduct the default image acquisition with a predefined lens position in accordance with the second lens focusing scheme. For example, the imaging apparatus may determine to conduct the default image acquisition and, as such, may select the predefined lens position for the focus position of the lens. In various embodiments, selection of the predefined lens position is based on a priority associated with the predefined lens position. The priority may correspond to a likelihood of successfully decoding visual indicia in images acquired using the predefined lens position. Accordingly, selection of the predefined lens position as the focus position for the lens may lead to an improved system response for the imaging apparatus. In various embodiments, the priority is based on a depth of field (DOF) associated with the predefined lens position, a distance between a previous position of the lens and the predefined lens position, a decoding status associated with one or more other images acquired using the predefined lens position, an environment of the target object (e.g., whether the target object is estimated to be relatively close to or relatively far from the imaging apparatus), or any combination thereof.

In various embodiments, the predefined lens position is based on one or more lens positions used to acquire one or more other images via the imaging engine prior to the first time occasion (e.g., based on one or more historical images). For example, the one or more other images may include images that were successfully decoded by the imaging apparatus prior to the first time occasion (e.g., prior to acquisition of the first image). In various embodiments, the predefined lens position may include the focus position used to acquire the most recently decoded (successfully decoded) image. The focus position associated with the most recently decoded (successfully decoded) image may be referred to herein as the last successful decode position.

In various embodiments, the predefined lens position is one of multiple candidate lens positions and selection of the predefined lens position is in accordance with a sequence. In various embodiments, the sequence is based on a respective priority associated with each candidate lens position of the multiple candidate lens positions. For example, the imaging apparatus may order the multiple candidate lens positions (e.g., multiple candidate focus positions for a lens) in the sequence based on priority, such that a first focus position within the sequence corresponds to a focus position with the highest priority among the multiple candidate focus positions and the last focus position within the sequence corresponds to a focus position with the lowest priority among the multiple candidate focus positions. In various embodiments, the sequence may include one or more candidate focus positions associated with one or more imagers. For example, the sequence may include one or more candidate focus positions associated with a near-field imager and/or one or more candidate focus positions associated with the far-field imager. One non-limiting example of the sequence is shown in the following data structure of Table 1:

TABLE 1

| 1 | 2 | 3 | 4 |
|---|---|---|---|
| Near | Far-Far | Far-Middle | Far-Near | in which a value of 1 corresponds to the first focus position within the sequence, a value of 2 corresponds to the second focus position within the sequence, a value of 3 corresponds to the third focus position within the sequence, and a value of 4 corresponds to the fourth focus position within the sequence. Although Table 1 illustrates a sequence of 4 candidate focus positions, it is to be understood that the sequence may include more than 4 candidate focus positions or less than 4 candidate focus positions. In the example of Table 1, "Near" corresponds to the near-field imager, "Far-Far" corresponds to a far focus of the far-field imager, "Far-Middle" corresponds to a middle focus of the far-field imager, and "Far-Near" corresponds to a near focus of the far-field imager. Although Table 1 illustrates a single focus position for the near-field imager (e.g., "Near"), it is to be understood that the near-field imager may include multiple candidate focus positions. Additionally, although Table 1 illustrates three candidate focus positions for the far-field imager (e.g., "Far-Far," "Far-Middle," and "Far-Near"), it is to be understood that the far-field imager and (and likewise the near-field imager) may have more than 3 candidate focus positions. For example, the far-field imager may include one or more focus positions between the far-far and the far-middle focus positions and/or one or more focus positions between the far-middle and the far-near focus positions.

In some such embodiments, during a second time occasion, the imaging apparatus may acquire a second image of the target object using the lens in accordance with the predefined lens position. In some examples, the imaging apparatus may select, in accordance with the sequence, a second predefined lens position from among the multiple candidate lens positions based on a failure to successfully decode visual indicia within the second image. In such examples, the predefined lens position has a higher priority than the second predefined lens position.

In various embodiments, the imaging apparatus may position the lens in the predefined lens position during the first time occasion. For example, the lens may be included in a second imager of the imaging engine and, as such, the imaging apparatus may move the lens to the predefined lens position concurrently with the acquisition of the first image. In some examples, positioning the lens in the predefined lens position during (e.g., concurrently with) the acquisition of the first image may increase a rate at which the imaging apparatus may decode visual indicia in the target image.

In various embodiments, the imaging apparatus may select an illuminator source for acquisition of one or more images (e.g., using the lens in accordance with the predefined lens position). In some such embodiments, selection of the illuminator source is based on the second imager. For example, the first image and the second imager may be associated with one or more illuminator sources and, as such, the imaging apparatus may select an illuminator source based on the imager the lens is included in. In one non-limiting example, the second image may include a far-field imager and the imaging apparatus may select a far-field illumination source.

In various embodiments, the imaging apparatus may re-attempt (e.g., retry) to capture an image of the aimer pattern, for example, to acquire real-time data with respect to changes in target distances. For example, during a second time occasion after the first time occasion, the imaging apparatus may project the aimer pattern onto a second target object (e.g., the target object or another target object). The imaging apparatus may acquire, during the second time occasion, a second image of the second target object in accordance with the focus position for the lens. In some examples, acquisition of the second image during the second time occasion is based on a predefined periodicity or expiration of one or more timers. The imaging apparatus may then determine a second focus position based on the detectability level of the aimer pattern in the second image.

Figure 4:
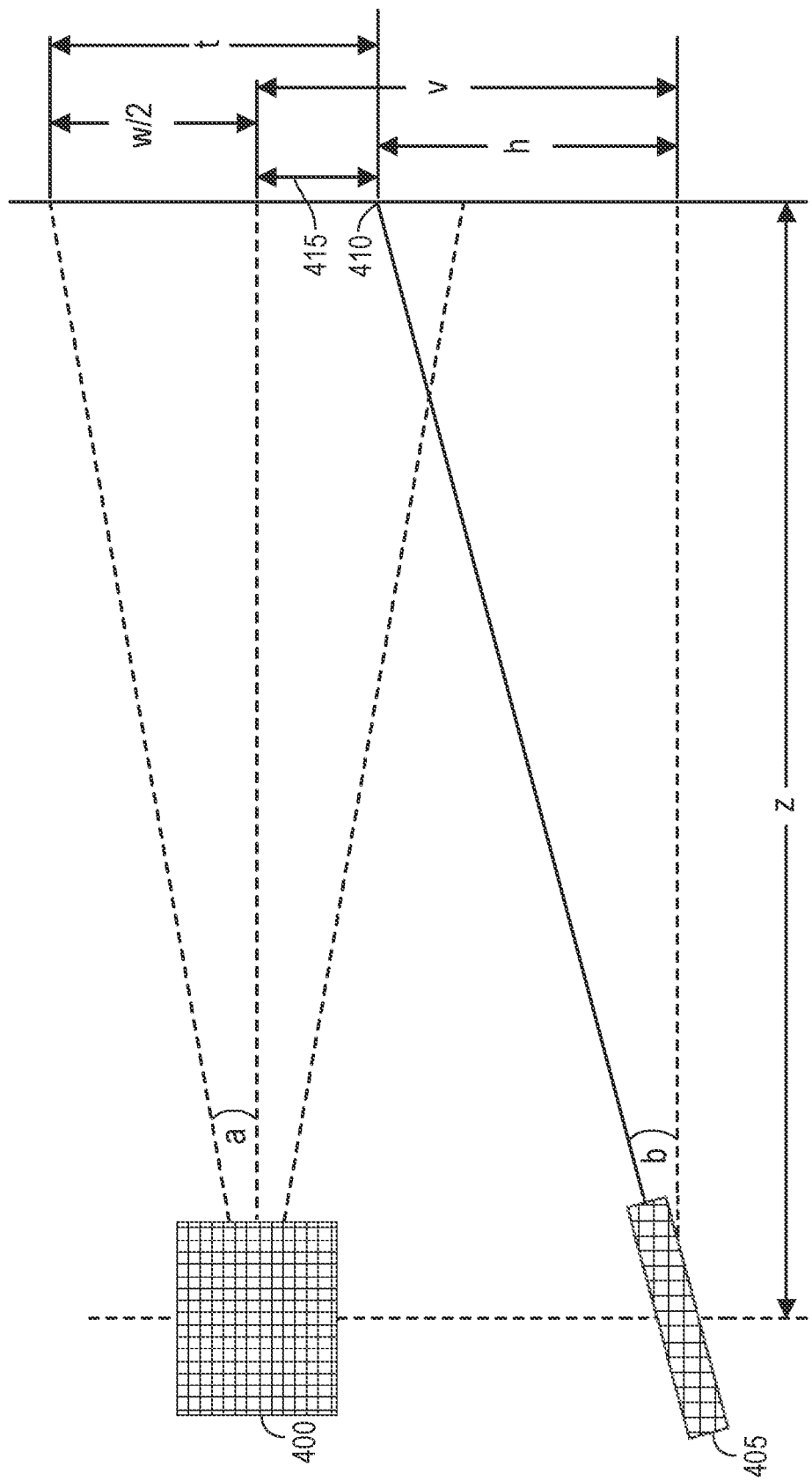
FIG. 4 illustrates a diagram associated with operational functionality of a multi-imager imaging apparatus, in accordance with at least one example embodiment of the present disclosure.

FIG. 4 illustrates a diagram associated with operational functionality of an imaging apparatus, in accordance with at least one example embodiment of the present disclosure. Various imaging devices, such as barcode scanners, may utilize triangulation based on an aimer pattern to determine the distance to a target object or surface based on the angle of the observed reflection of the aimer pattern. Some barcode scanners, such as long-range scanners equipped with dual imagers, may face multiple challenges, such as excessive brightness, dust, and uneven lighting conditions, which may occur in warehouses and manufacturing plants environment. For example, in such conditions, it may be relatively difficult for an imager of a barcode scanners to capture focused images properly.

Various aspects of the present disclosure provide for improved scanning performance in various environmental conditions (e.g., excessive brightness, dust, and uneven lighting conditions), through periodically capturing of images of a target object with an aimer pattern (e.g., a laser aimer dot). As illustrated in FIG. 4, an imaging apparatus (e.g., including at least an imager 400) may use an aimer 405 to project an aimer pattern onto a surface (e.g., the surface of a target object). When the projected aimer pattern interacts with the surface, at least a portion of the aimer pattern is reflected towards the imaging apparatus (e.g., towards the imager 400 of the imaging apparatus). The imager 400 may capture an image of the reflected light and the aimer pattern location (e.g., coordinates) may be detected in the captured image.

In the example of FIG. 4, the parameter "z" is the distance between the imaging apparatus and the target object, the parameter "a" is a horizontal field of view angle of the imager 400, the parameter "b" is the tilt angle of aimer 405 with its optical axis, the parameter "h" is the distance between the location of the aimer pattern and the intersection of a line through the aimer 405 and normal to the image plane, the parameter "t" is the distance between the left edge of the field-of-view and the aimer pattern, the parameter "v" is the distance between the optical axis of the imager 400 and the aimer 405, and the parameter "w" is the distance between left and right edge of the field-of-view of the imager 400. In the example of FIG. 4, a reference position is located at w/2. In some examples, a value of the parameter "v" may depend on the imaging apparatus (and may be fixed), and respective values of one or more other parameters may depend on the value of the parameter "z."

In various embodiments, the imaging apparatus can determine a location 410 of the aimer pattern (in space) based on one or more pixels associated with the aimer pattern in the captured image. Additionally, or alternatively, the imaging apparatus may determine an aimer offset 415 based on the location 410 of the aimer pattern. In the example of FIG. 4, the aimer offset 415 corresponds to a difference between the reference position and the location 410 of the aimer pattern. In other words, the aimer offset 415 corresponds to the difference between the parameter "v" and the parameter "h." In some examples, the aimer offset 415 may correspond to a distance between the current position of the aimer pattern (e.g., the location 410, which may be denoted as Xcurrent) to the reference position (e.g., a calibrated position, which may be denoted as Xcal). In various embodiments, the aimer offset 415 is measured by computing the difference between the current aimer location in space (target) with one or more known calibrated data points.

In various embodiments, the imaging apparatus can determine a value of the parameter "z" based on the position of the one or more pixels associated with the aimer pattern in the captured image (e.g., based on the pixel location of the aimer pattern). For example, a pixel in the captured image may have (e.g., correspond to) an angular width, and the angular width may be used to determine the value of the parameter "z." In some examples, the location 410 may correspond to a first pixel and a reference point (e.g., the point of the calibration) may correspond to a second pixel (e.g., at the left side of the image, which corresponds to the line in FIG. 4 that is common to the parameters "t" and "w/2"). In some such examples, the value of the parameter "z" may be based on the angular width and a distance between the first pixel and the second pixel.

In various embodiments, one or more lookup tables may be used to estimate the distance between the imaging apparatus and the target object based on the aimer offset 415. In other words, the one or more lookup tables may be used to estimate a value of the parameter "z" based on the location 410 (e.g., and the aimer offset 415). In some examples, a first lookup table may be used to determine the value of the parameter "z" based on the location 410 (e.g., and the aimer offset 415), and a second lookup table may be used to determine a focus position for a lens in the imager 400 based on the determined value of the parameter "z."

In some other examples, the imaging apparatus may use a single lookup table to determine the focus position for the lens in the imager 400 based on the location of the aimer pattern. For example, rather than using the first lookup table, the imaging apparatus may compute the value of the parameter "z." In other words, the imaging apparatus may compute (e.g., directly compute) the estimated distance from imager 400 to a target object (e.g., a value of the parameter "z") based on the aimer offset 415 and one or more other parameters, such as "a," "b," and "v." The imaging apparatus may then use the estimated distance (e.g., the directly computed distance estimate) as key into the second lookup table. That is, the second lookup table may be used to determine the focus position for the lens in the imager 400 based on the computed value of the parameter "z." In some examples, to increase an accuracy of the computed distance, the imager 400 (e.g., each imager in the imaging apparatus) may be calibrated to obtain values of the parameters "a," "b," and "v." In some such examples, the imaging apparatus may determine (e.g., through calibration) multiple 'a' and/or 'v' values, for example, in the case of multiple image sensors and lens positions (e.g., in a multi-imager imaging environment). In various embodiments, the calibration may be performed prior to deployment of the imaging apparatus (e.g., in the factory), for example, for one or more sensors and lens positions (e.g., for each image sensor and lens position). In some such examples, the calibration may be performed by capturing multiple images at one or more known target distances. Additionally, or alternatively, the calibration may be performed by capturing a barcode (or another pattern with known dimensions) at multiple distances.

In some other examples, the imaging apparatus may use a third lookup table to determine the focus distance based on the location of the aimer pattern (e.g., the pixel position of the aimer pattern). For example, the first lookup table and the second lookup table may be reduced to (e.g., merged into) a single lookup table (e.g., the third lookup table). In some such examples, the imaging apparatus may refrain from computing one or more intermediate values (e.g., a value of the parameter "t," a value of 415, a value of the parameter "z"). For example, rather than computing a value of the parameter "z" and using the value to lookup which sensor (e.g., imager) to use and/or which lens position to select, the imaging apparatus may use the third lookup table (e.g., may transform the first and second lookup tables), such that the location of the aimer pattern (e.g., the pixel position of the aimer pattern) may be directly mapped to a sensor and/or a lens position.

In some examples, periodically capturing images with aimer pattern provides real-time data/information with respect to changes in target distance (e.g., variations in the value of the parameter "z"). In various embodiments, information associated with changes in the target distance is used, for example, for selecting a suitable imager and determining a focus position for a lens in the imager 400 (or another imager of the imaging apparatus) and increasing the scanning performance. In various embodiments, multiple (e.g., two) lens positions can be chosen, for example, to increase field depth. In some examples, such as examples in which captured images become oversaturated, the imaging apparatus may use a default lens focusing scheme to determine a focus position for the lens in the imager 400.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code).

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any disclosures or of what may be claimed, but rather as descriptions of features specific to particular embodiments of particular disclosures. Various features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In various circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In various implementations, multitasking and parallel processing may be advantageous.

What is claimed is:

1. A method comprising:
   projecting, during a first time occasion, an aimer pattern onto a target object within a field of view of a first imager of an imaging engine;
   acquiring, during the first time occasion, a first image of the target object via the first imager;
   selecting a lens focusing scheme based at least in part on a detectability level of the aimer pattern in the first image, wherein selection of the lens focusing scheme is between a first lens focusing scheme associated with a location of the aimer pattern and a second lens focusing scheme associated with at least one predefined lens position; and
   determining a focus position for a lens in the imaging engine in accordance with the lens focusing scheme.

2. The method of claim 1, wherein selecting the lens focusing scheme comprises:
   selecting the first lens focusing scheme based at least in part on the detectability level of the aimer pattern satisfying a threshold, wherein determination of the focus position for the lens is in accordance with the first lens focusing scheme.

3. The method of claim 2, further comprising:
   identifying the location of the aimer pattern based at least in part on the first image; and
   determining, using one or more lookup tables, the focus position for the lens based at least in part on the location of the aimer pattern.

4. The method of claim 3, wherein the one or more lookup tables are associated with the first imager.

5. The method of claim 3, wherein determining the focus position comprises:
   estimating, using a first lookup table of the one or more lookup tables, a distance between the imaging engine and the target object, wherein the distance is based at least in part on the location of the aimer pattern; and
   determining, using a second lookup table, the focus position for the lens based at least in part on the distance.

6. The method of claim 5, further comprising:
   selecting an imager of the imaging engine based at least in part on the distance, wherein the lens is included in the imager, and wherein the imager comprises the first imager or a second imager of the imaging engine.

7. The method of claim 3, further comprising:
   determining, using the one or more lookup tables, a second focus position for the lens based at least in part on the location of the aimer pattern corresponding to an intermediate focus position between the focus position and the second focus position;
   acquiring a second image of the target object using the lens in accordance with the focus position; and
   acquiring a third image of the target object using the lens in accordance with the second focus position.

8. The method of claim 3, further comprising:
   acquiring a second image of the target object using the lens in accordance with the focus position;
   performing one or more operations to decode visual indicia within the second image; and
   determining a second focus position for the lens in accordance with the second lens focusing scheme based at least in part on a failure to successfully decode the visual indicia within the second image.

9. The method of claim 3, wherein determining the focus position comprises:
   determining, using a single lookup table, the focus position for the lens based at least in part on the location of the aimer pattern.

10. The method of claim 1, wherein selecting the lens focusing scheme comprises:
    selecting the second lens focusing scheme based at least in part on the detectability level of the aimer pattern failing to satisfy a threshold, wherein determination of the focus position for the lens is in accordance with the second lens focusing scheme.

11. The method of claim 10, wherein determining the focus position for the lens comprises:
    selecting a predefined lens position of the at least one predefined lens position for the focus position of the lens, wherein the predefined lens position is based at least in part on one or more lens positions used to acquire one or more other images via the imaging engine prior to the first time occasion, wherein decoding visual indicia included in the one or more other images was successful.

12. The method of claim 10, wherein determining the focus position for the lens comprises:
    selecting a predefined lens position of the at least one predefined lens position for the focus position of the lens, wherein the predefined lens position is based at least in part on a priority associated with the predefined lens position, and wherein the priority corresponds to a likelihood of successfully decoding visual indicia in images acquired using the predefined lens position.

13. The method of claim 12, wherein the priority is based at least in part on a depth of field associated with the predefined lens position, a distance between a previous position of the lens and the predefined lens position, a decoding status associated with one or more other images acquired using the predefined lens position, an environment of the target object, or any combination thereof.

14. The method of claim 12, wherein the predefined lens position is one of a plurality of candidate lens positions, and wherein selection of the predefined lens position is in accordance with a sequence that is based at least in part on a respective priority associated with each candidate lens position of the plurality of candidate lens positions.

15. The method of claim 14, further comprises:
acquiring, during a second time occasion after the first time occasion, a second image of the target object using the lens in accordance with the predefined lens position; and
selecting, in accordance with the sequence, a second predefined lens position based at least in part on a failure to successfully decode visual indicia within the second image, wherein the second predefined lens position comprises another one of the plurality of candidate lens positions, and wherein the predefined lens position has a higher priority than the second predefined lens position.

16. The method of claim 10, further comprising:
positioning the lens in a predefined lens position of the at least one predefined lens position during the first time occasion, wherein the lens is included in a second imager of the imaging engine.

17. The method of claim 1, further comprising:
selecting an illuminator source for acquisition of one or more images using the lens in accordance with the predefined lens position, wherein selection of the illuminator source is based at least in part on the focus position.

18. The method of claim 1, further comprising:
projecting, during a second time occasion after the first time occasion, the aimer pattern onto a second target object, wherein the second target object comprises the target object or another target object;
acquiring, during the second time occasion, a second image of the second target object in accordance with the focus position for the lens, wherein acquisition of the second image during the second time occasion is based at least in part on a predefined periodicity or expiration of a timer; and
determining a second focus position based at least in part on the detectability level of the aimer pattern in the second image.

19. The method of claim 1, wherein the detectability level is based at least in part on an average region of interest and an intensity difference between one or more pixels associated with the aimer pattern in the first image and one or more other pixels in the first image.

20. The method of claim 1, wherein the imaging engine comprises a multi-imager imaging engine.

21. The method of claim 1, wherein the location of the aimer pattern corresponds to a position of at least one pixel in the first image.

22. An apparatus comprising:
an imaging engine; and
one or more processors operationally coupled with the imaging engine, wherein the one or more processors are configured to cause the apparatus to:
project, during a first time occasion, an aimer pattern onto a target object within a field of view of a first imager of the imaging engine;
acquire, during the first time occasion, a first image of the target object via the first imager;
select a lens focusing scheme based at least in part on a detectability level of the aimer pattern in the first image, wherein selection of the lens focusing scheme is between a first lens focusing scheme associated with a location of the aimer pattern and a second lens focusing scheme associated with at least one predefined lens position; and
determine a focus position for a lens in the imaging engine in accordance with the lens focusing scheme.

23. A computer program product comprising at least one non-transitory computer-readable storage medium having computer program code stored thereon that, in execution with at least one processor, is configured for:
projecting, during a first time occasion, an aimer pattern onto a target object within a field of view of a first imager of an imaging engine;
acquiring, during the first time occasion, a first image of the target object via the first imager;
selecting a lens focusing scheme based at least in part on a detectability level of the aimer pattern in the first image, wherein selection of the lens focusing scheme is between a first lens focusing scheme associated with a location of the aimer pattern and a second lens focusing scheme associated with at least one predefined lens position; and
determining a focus position for a lens in the imaging engine in accordance with the lens focusing scheme.

* * * * *